United States Patent [19]

Kaspszyk

[11] Patent Number: 5,636,503
[45] Date of Patent: Jun. 10, 1997

[54] HORSE BLANKET KEEPER

[75] Inventor: Mary A. Kaspszyk, Perkasie, Pa.

[73] Assignee: Broken Arrow Specialties, Perkasie, Pa.

[21] Appl. No.: 294,940

[22] Filed: Aug. 23, 1994

[51] Int. Cl.⁶ .................................................. B68B 5/00
[52] U.S. Cl. .................. 54/23; 54/79.2; 24/17 A
[58] Field of Search ............. 54/23, 79.2; 24/17 A, 24/300, 301, 302, 452

[56] References Cited

U.S. PATENT DOCUMENTS

| | | |
|---|---|---|
| 2,567,019 | 9/1951 | Johnson. |
| 3,000,384 | 9/1961 | Piers, Jr. ................ 24/17 A X |
| 3,828,521 | 8/1974 | Dulaney ........................ 54/23 |
| 4,187,663 | 2/1980 | LaCroix, Jr. ................... 54/23 |
| 4,414,790 | 11/1983 | Mitchell ........................ 54/2 |
| 4,854,015 | 8/1989 | Shaull .................. 24/17 A X |
| 4,905,458 | 3/1990 | Johnston et al. ............... 54/23 |
| 4,999,980 | 3/1991 | McGowan ...................... 54/23 |
| 5,125,219 | 6/1992 | Sligo ........................... 54/23 |

Primary Examiner—Robert P. Swiatek
Attorney, Agent, or Firm—Shoemaker and Mattare, Ltd.

[57] ABSTRACT

A horse blanket keeper consists of only two pieces: a strap consisting essentially of a substantially elastic fabric material having integral hook and loop material of one gender on one side, away from the horse, traction enhancing rubber ribs on the opposite side, facing the horse, and a connector piece of the opposite gender affixed at one end of the strap, with its fastening surface facing opposite that of the strap, so that when the strap is passed around the horse, the piece can be adhered at any position to the strap.

6 Claims, 3 Drawing Sheets

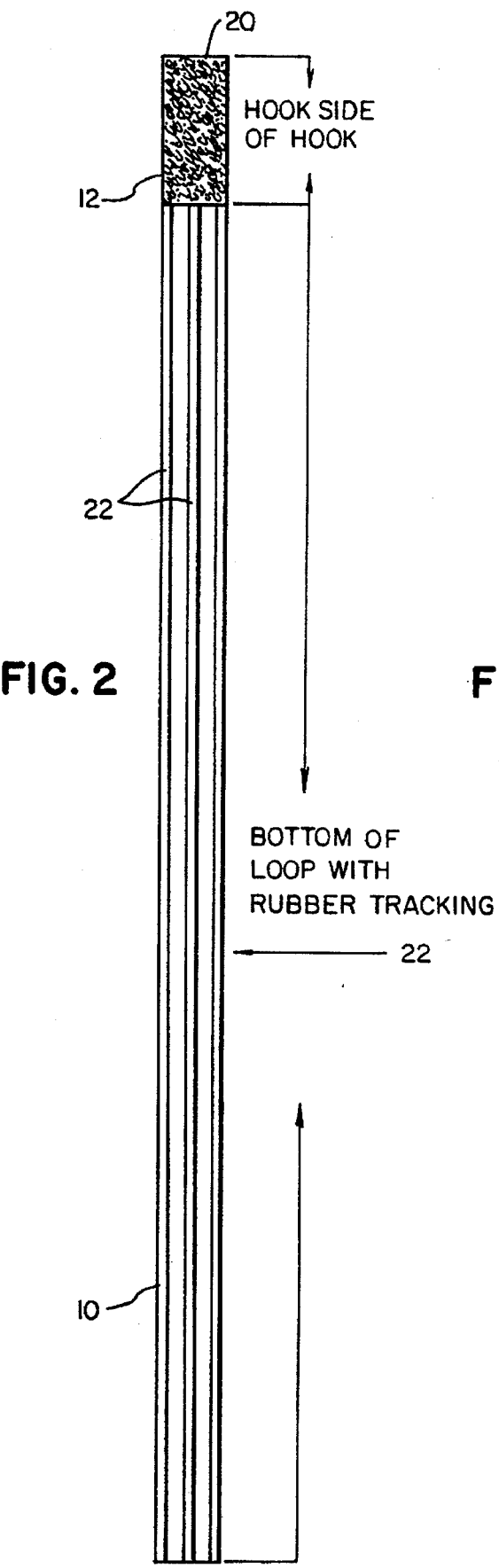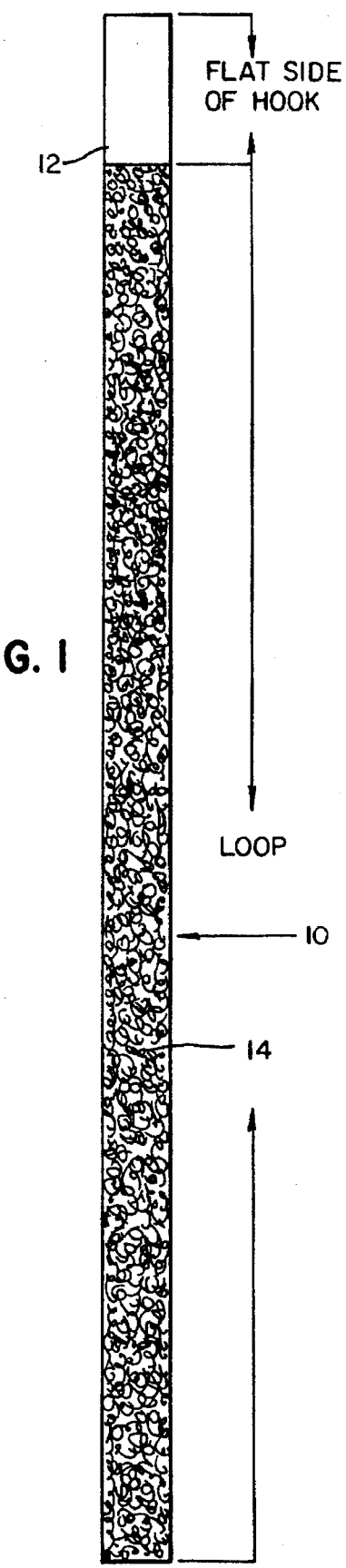

HORSE BLANKET KEEPER

BACKGROUND OF THE INVENTION

This invention relates generally to animal husbandry and more particularly to a belt or band for securing a blanket, sheet or cooler on a horse or other animal. To avoid wordiness below, we refer to all such devices generically as "blankets".

Preventing blankets from shifting away from their intended positions has always been a problem. Intentionally or otherwise, by rolling, or rubbing against objects, horses can move blankets from their installed positions to positions that are not only unsightly, but also uncomfortable, and which partially defeat the intended purpose of the blanket. In a displaced position, the blanket may be more susceptible to damage, loss or destruction, incurring the time and expense of repairing or replacing the blanket. And beyond being uncomfortable, a displaced blanket may sometimes be a danger to the horse. Its limbs can become entangled in the closure straps, for example. In some instances, a displaced blanket or the like can scare an animal, causing it to run wildly, buck, kick or roll frantically. People, including those who try to subdue the animal, and other animals nearby, are endangered. At the least, the horse has to be rescued, and worse, serious permanent injuries can result. Our experience is that most prior blanket retainers simply do not keep blankets put.

A further problem with prior blanket retainers is that they required buckle closures for tightening. The straps are typically made of a nonelastic leather or fabric, and have to be tightened substantially, if they are to be stable; buckles are usually used as tighteners. Unfortunately, horses are notorious for damaging or breaking buckle closures by rubbing against objects or rolling.

Prior inventors have disclosed a variety of elastic girths and the like. U.S. Pat. Nos. 4,187,663, 3,828,521 and 2,567,019 are exemplary. Other inventors have suggested various arrangements of internal ribs or treads to increase the holding force of the strap. See U.S. Pat. No. 4,905,458. Still others have used velcro-type material in horse cinches or girths. See U.S. Pat. No. 5,125,219. But until now, no one has been able to combine all these desirable features in a single, simple unit. We have discovered a material that makes the combination possible, as described below.

SUMMARY OF THE INVENTION

An object of the invention is prevent injury to horses and other animals by providing a more secure keeper for their blankets and the like.

A related object is to protect people and animals nearby from injury by a nearby horse by removing a source of anxiety, namely, loose blankets.

A further object of the invention is to eliminate the need for buckles in a blanket retaining system.

These and other objects are attained by a horse blanket keeper formed entirely from a material which is both highly elastic and is covered on one side with a hook or loop type continuous (velcro) fastener. A smaller piece of material of the opposite type is attached to one end of the strap, on the opposite side, so that the strap can be secured around an animal without the need for a buckle.

Because it is elastic, the strap can give with the horse, and thus does not have to be tightened as much as did prior straps. Thus, it should be more comfortable for the horse. Additionally, it is harder for the horse to dislodge. The stability of the strap is enhanced by providing strips of soft rubber along its reverse side.

An additional advantage of the invention is that the strap is extremely simple to apply, and has virtually continuous adjustability.

BRIEF DESCRIPTION OF THE DRAWINGS

In the accompanying drawings,

FIG. 1 is a top view of a blanket strap embodying the invention, showing the side of the strap that faces away from the horse;

FIG. 2 is a bottom view thereof, showing the side toward the horse;

DESCRIPTION OF THE PREFERRED EMBODIMENT

Figure 3:
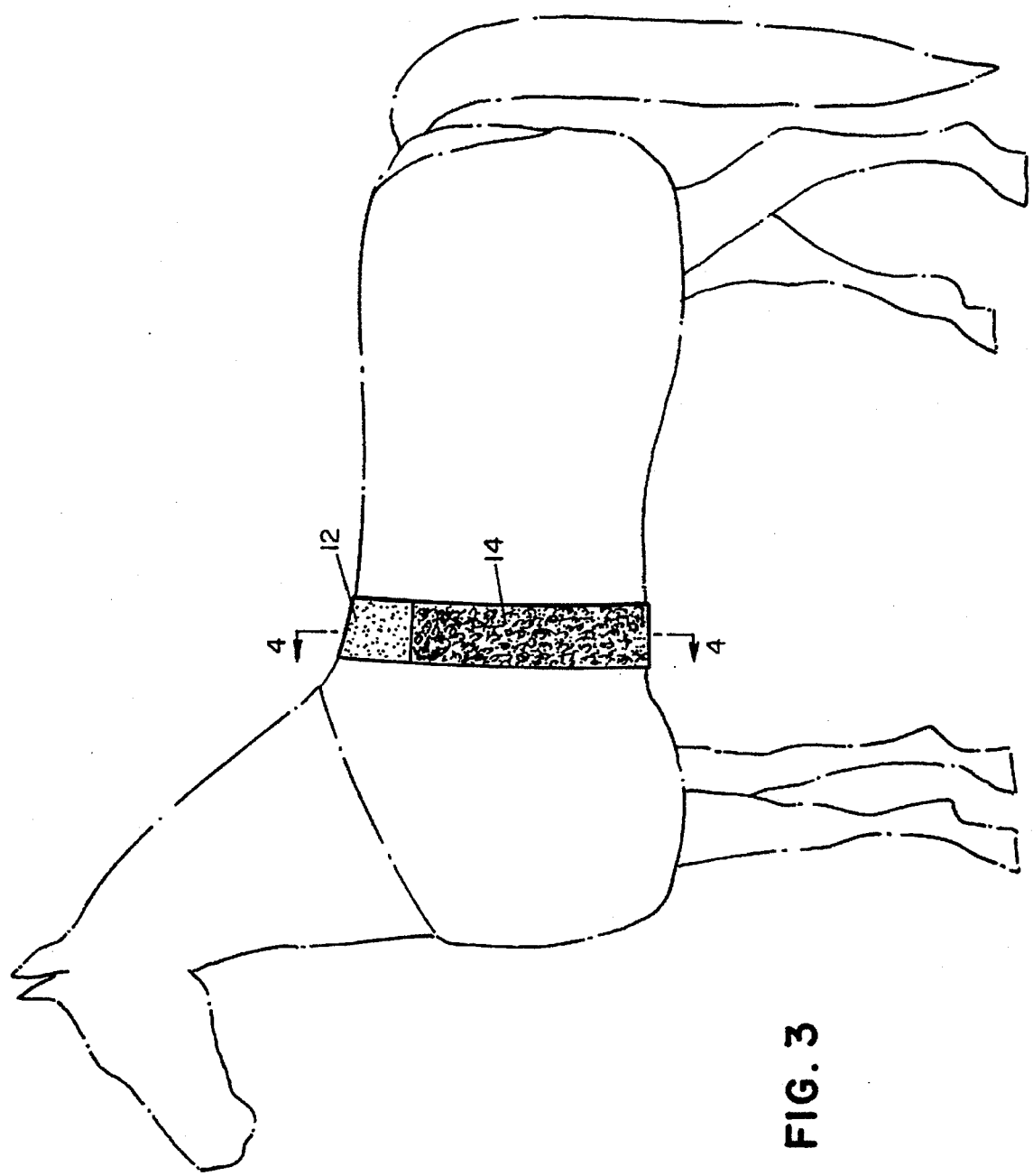
FIG. 3 is a side elevation of the strap, retaining a blanket on a horse.
Figure 4:
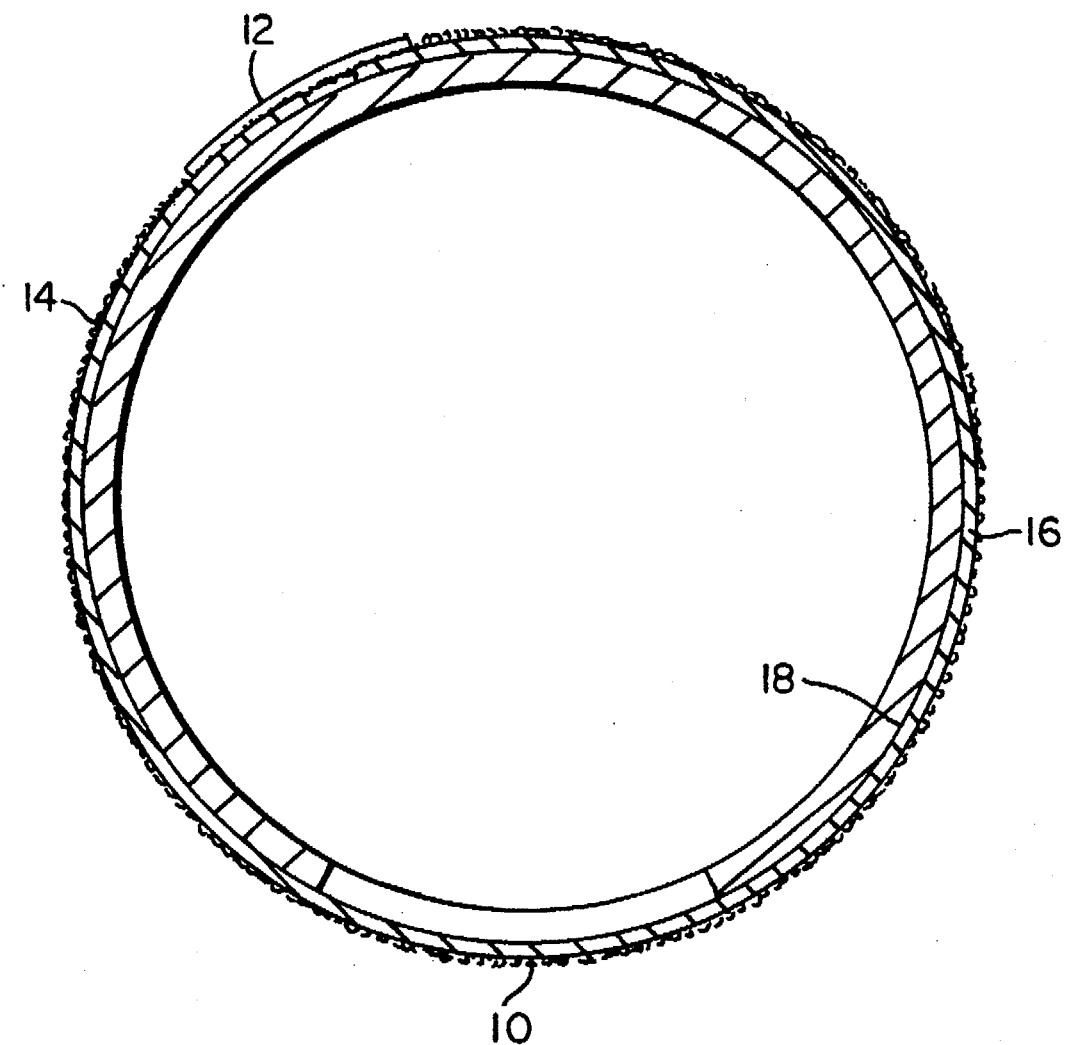
FIG. 4 is a sectional view of the strap and blanket, taken on the vertical plane 4—4 in FIG. 3.

A horse blanket keeper embodying the invention is shown laid out flat in FIGS. 1 and 2. The keeper includes a long elastic strap 10, with a short connector 12 at one end. The connector is joined to the strap by sewing, an adhesive, or other means.

All materials, even metals, are elastic to some degree. The term "elastic", as used herein to describe the strap, is meant to connote stretchable in the commonly understood sense: substantially more so than leather or ordinary cotton belts. A six foot strap which stretches more than an inch under a fifty pound tension is considered "elastic" for our purposes. That is, the strap should have a spring constant of less than 50 pounds per inch. The connector 12 need not be elastic, but it may be.

The strap, and the connector, together form a hook-and-loop ("Velcro") type fastener. Strong polymeric loops 14, formed integrally with the elastic substrate 16, extend outward from one entire surface of the strap. The strap is installed on the horse with the loops facing outward. The connector comprises a substrate 18 with an array of hooks 20, each adapted to engage one of the loops on the strap when the connector is pressed against it.

It is important for this invention that the hook and loop fasteners be integral with the elastic substrate material. The preferred material, called "elastic E-loop" is available from V. Louison et Cie., La Fouillouse, France, under model number 917-100MM.

Prior Velcro fasteners used in similar applications were not stretchable, and thus would have had to be attached to a separate, stretchable substrate if that combination were desired. Conventional inelastic Velcro strips would have had to be segmented, so as not to interfere with the elastic function of the substrate. Such an arrangement would be more difficult and costly to manufacture than the material now suggested.

Obviously, perhaps, the fastener halves could be reversed. The strap could be of a hook-bearing material, and the connector piece of a loop-bearing material. This is not the preferred arrangement, because hooks tends to retain more foreign matter than do loops, but it would work. So as to cover both variations, we use the terms "hook and loop material of one gender" and "of the other gender" to connote hooks and loops, or vice-versa. The material having an array of hooks may be thought of as male.

To enhance the traction of the strap against the horse's skin, parallel soft rubber tracks or ribs 22 are applied to the side of the strap opposite the hooks. The ribs may be preformed, and then bonded to the substrate, but preferably they are applied by spraying or the like in an initially liquid form. The rubber cannot be rigid lengthwise, but must stretch with the substrate.

To install the keeper, after first having placed a blanket over the animal, hold the hook end in one hand, just below the point of one shoulder, and drop the strap over the horse. Then, reach under the horse, grasp the free end of the strap, and take it up under the belly to meet the hook end. Pull the ends snug around the blanket, and then press the hook end piece against the loop-bearing outer surface of the strap. It will be found that the strap described provides excellent blanket retention.

Since the invention is subject to modifications and variations, it is intended that the foregoing description and the accompanying drawings shall be interpreted as illustrative of only one form of the invention, whose scope is to be measured by the following claims.

I claim:

1. A horse blanket keeper comprising a strap whose entire length consists essentially of a substantially elastic fabric material having integral hook and loop material of one gender on one entire side of the strap, away from the horse, and means for enhancing traction on the opposite side, facing the horse, and a connector piece of hook and loop material of the opposite gender affixed at one end of the strap, with its fastening surface facing opposite that of the strap, toward the horse, so that when the strap is passed around the horse, the connector piece can be adhered at any position along the entire length of the strap.

2. The invention of claim 1, wherein the strap has a spring constant of less than 50 pounds per inch.

3. The invention of claim 1, wherein the traction enhancing means comprises a plurality of rubber ribs for engaging the animal.

4. The invention of claim 3, wherein the rubber ribs are formed integrally with the fabric material.

5. The invention of claim 1, wherein the fabric material on the strap consists of an array of loops, and the fabric material on the connector piece consists of an array of hooks.

6. The invention of claim 1, wherein the keeper consists of only said strap and said connector piece and stitching interconnecting the two.

* * * * *